US006574847B1

(12) United States Patent

Scroggins

(10) Patent No.: US 6,574,847 B1

(45) Date of Patent: Jun. 10, 2003

(54) VALVE KEEPER INSTALLATION DEVICE

(76) Inventor: Tracy L. Scroggins, 6303 113th Ave., Fennville, MI (US) 49048

( * ) Notice: Subject to any disclaimer, the term of this patent is extended or adjusted under 35 U.S.C. 154(b) by 0 days.

(21) Appl. No.: 10/259,937

(22) Filed: Sep. 27, 2002

(51) Int. Cl.[7] .................................... B23P 19/04

(52) U.S. Cl. .............................. 29/249; 81/302; 29/229

(58) Field of Search .......................... 29/249, 229, 227, 29/219, 220, 221, 268; 81/415–418, 424, 424.5, 420–423, 426, 426.5, 427.5, 319

(56) References Cited

U.S. PATENT DOCUMENTS

| | | | | | |
|---|---|---|---|---|---|
| 1,924,246 | A | * | 8/1933 | Kulp | 29/86.3 |
| 2,439,785 | A | | 4/1948 | Feitl et al. | |
| 2,515,292 | A | * | 7/1950 | Carr | 240/6.46 |
| 2,519,024 | A | | 8/1950 | Collett | |
| 4,475,276 | A | * | 10/1984 | Staten | 29/229 |
| 4,697,483 | A | | 10/1987 | Rodgers | |
| D337,247 | S | | 7/1993 | Dart | |
| 5,349,732 | A | | 9/1994 | Spence | |
| 5,371,658 | A | * | 12/1994 | Christie | 362/109 |
| 5,458,029 | A | * | 10/1995 | Walsky | 81/302 |
| 5,964,131 | A | | 10/1999 | Seber et al. | |

* cited by examiner

*Primary Examiner*—Joseph J. Hail, III
*Assistant Examiner*—Daniel Shanley

(57) ABSTRACT

A valve keeper installation device for facilitating installation of valve keepers. The valve keeper installation device includes a pliers member for engaging and compressing valve locks including: a jaw portion for providing a compressive force; a handle portion designed for being grasp by a human hand, and having two opposed members such that squeezing both opposed members towards each other tightens the jaw portion providing a compressive force; and a cup portion integrally coupled to the jaw portion, and designed for engaging a valve keeper, the cup portion includes a first curved member integrally coupled to a first jaw member and a second curved member integrally coupled to a second jaw member, the first and second curved members being positioned such that an longitudinal axis of the cup portion is substantially collinear with a longitudinal axis of the device.

6 Claims, 4 Drawing Sheets

VALVE KEEPER INSTALLATION DEVICE

BACKGROUND OF THE INVENTION

1. Field of the Invention

The present invention relates to valve pullers and more particularly pertains to a new valve keeper installation device for facilitating installation of valve keepers.

2. Description of the Prior Art

The use of valve pullers is known in the prior art. More specifically, valve pullers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,349,732; U.S. Pat. No. Des. 337,247; U.S. Pat. No. 4,697,483; U.S. Pat. No. 5,964,131; U.S. Pat. No. 2,439,785; and U.S. Pat. No. 2,519,024.

While these devices fulfill their respective, particular objectives and requirements, the aforementioned patents do not disclose a new valve keeper installation device. The inventive device includes a pliers member for engaging and compressing valve locks including: a jaw portion for providing a compressive force; a handle portion designed for being grasp by a human hand, and having two opposed members such that squeezing both opposed members towards each other tightens the jaw portion providing a compressive force; and a cup portion integrally coupled to the jaw portion, and designed for engaging a valve keeper, the cup portion includes a first curved member integrally coupled to a first jaw member and a second curved member integrally coupled to a second jaw member, the first and second curved members being positioned such that an longitudinal axis of the cup portion is substantially collinear with a longitudinal axis of the device.

In these respects, the valve keeper installation device according to the present invention substantially departs from the conventional concepts and designs of the prior art, and in so doing provides an apparatus primarily developed for the purpose of facilitating installation of valve keepers.

SUMMARY OF THE INVENTION

In view of the foregoing disadvantages inherent in the known types of valve pullers now present in the prior art, the present invention provides a new valve keeper installation device construction wherein the same can be utilized for facilitating installation of valve keepers.

The general purpose of the present invention, which will be described subsequently in greater detail, is to provide a new valve keeper installation device apparatus and method which has many of the advantages of the valve pullers mentioned heretofore and many novel features that result in a new valve keeper installation device which is not anticipated, rendered obvious, suggested, or even implied by any of the prior art valve pullers, either alone or in any combination thereof.

To attain this, the present invention generally comprises a pliers member for engaging and compressing valve locks including: a jaw portion for providing a compressive force; a handle portion designed for being grasp by a human hand, and having two opposed members such that squeezing both opposed members towards each other tightens the jaw portion providing a compressive force; and a cup portion integrally coupled to the jaw portion, and designed for engaging a valve keeper, the cup portion includes a first curved member integrally coupled to a first jaw member and a second curved member integrally coupled to a second jaw member, the first and second curved members being positioned such that an longitudinal axis of the cup portion is substantially collinear with a longitudinal axis of the device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new valve keeper installation device apparatus and method which has many of the advantages of the valve pullers mentioned heretofore and many novel features that result in a new valve keeper installation device which is not anticipated, rendered obvious, suggested, or even implied by any of the prior art valve pullers, either alone or in any combination thereof.

It is another object of the present invention to provide a new valve keeper installation device which may be easily and efficiently manufactured and marketed.

It is a further object of the present invention to provide a new valve keeper installation device which is of a durable and reliable construction.

An even further object of the present invention is to provide a new valve keeper installation device which is susceptible of a low cost of manufacture with regard to both materials and labor, and which accordingly is then susceptible of low prices of sale to the consuming public, thereby making such valve keeper installation device economically available to the buying public.

Still yet another object of the present invention is to provide a new valve keeper installation device which provides in the apparatuses and methods of the prior art some of the advantages thereof, while simultaneously overcoming some of the disadvantages normally associated therewith.

Still another object of the present invention is to provide a new valve keeper installation device for facilitating installation of valve keepers.

Yet another object of the present invention is to provide a new valve keeper installation device which includes a pliers member for engaging and compressing valve locks including: a jaw portion for providing a compressive force; a handle portion designed for being grasp by a human hand, and having two opposed members such that squeezing both opposed members towards each other tightens the jaw portion providing a compressive force; and a cup portion integrally coupled to the jaw portion, and designed for engaging a valve keeper, the cup portion includes a first curved member integrally coupled to a first jaw member and a second curved member integrally coupled to a second jaw member, the first and second curved members being positioned such that an longitudinal axis of the cup portion is substantially collinear with a longitudinal axis of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
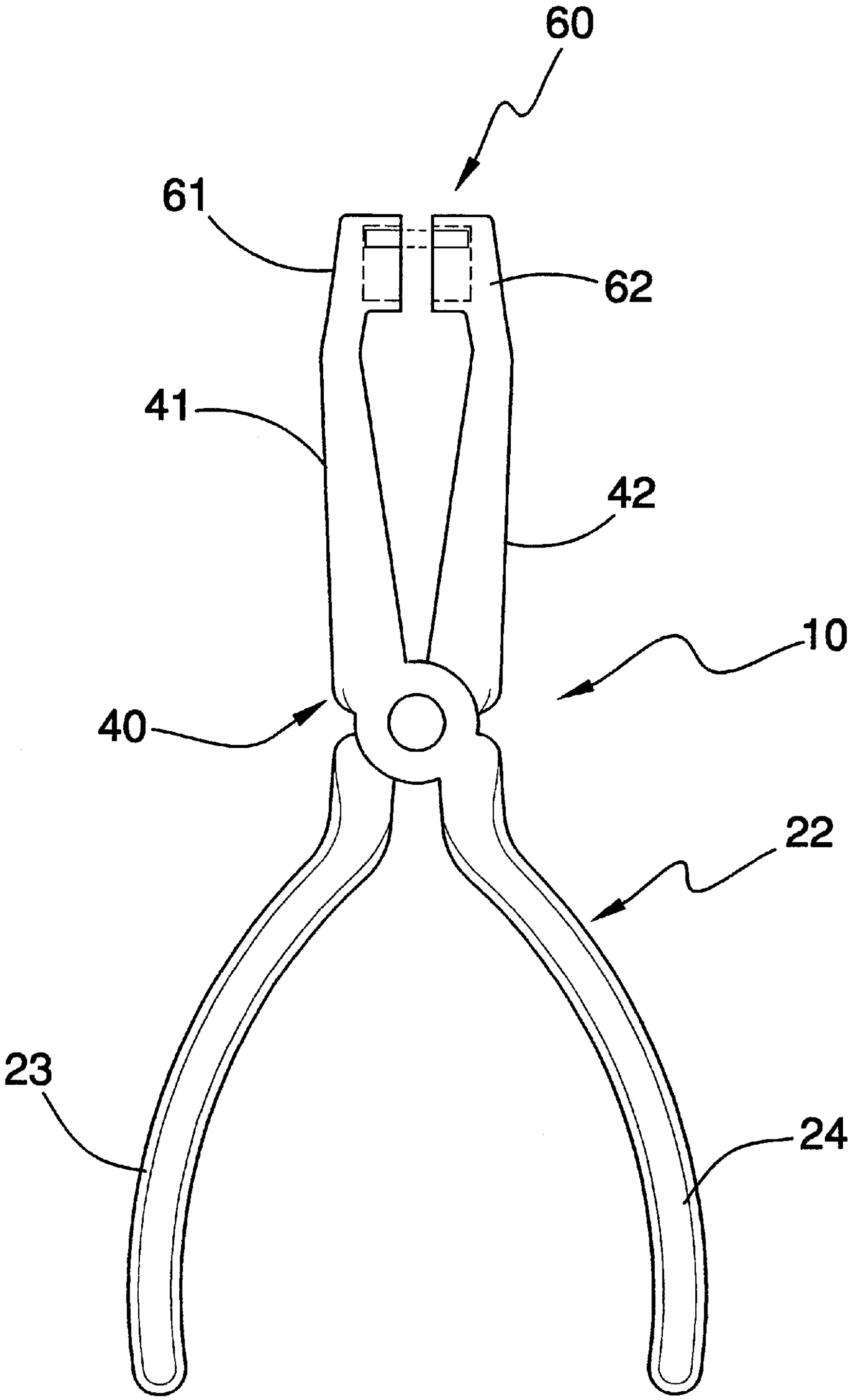
FIG. 1 is a schematic front view of a new valve keeper installation device according to the present invention in use.
Figure 2:
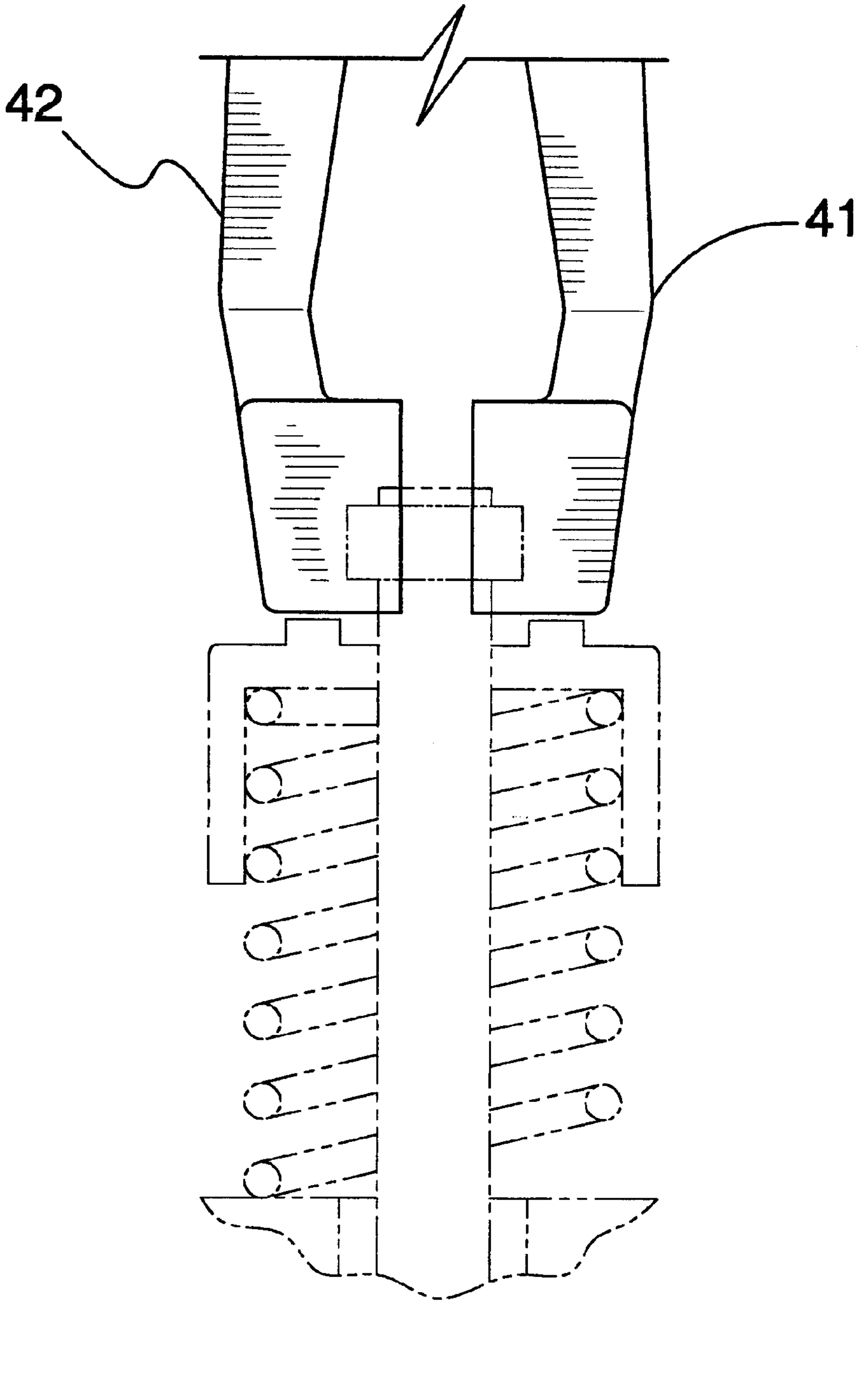
FIG. 2 is a schematic front detail view of the present invention.
Figure 3:
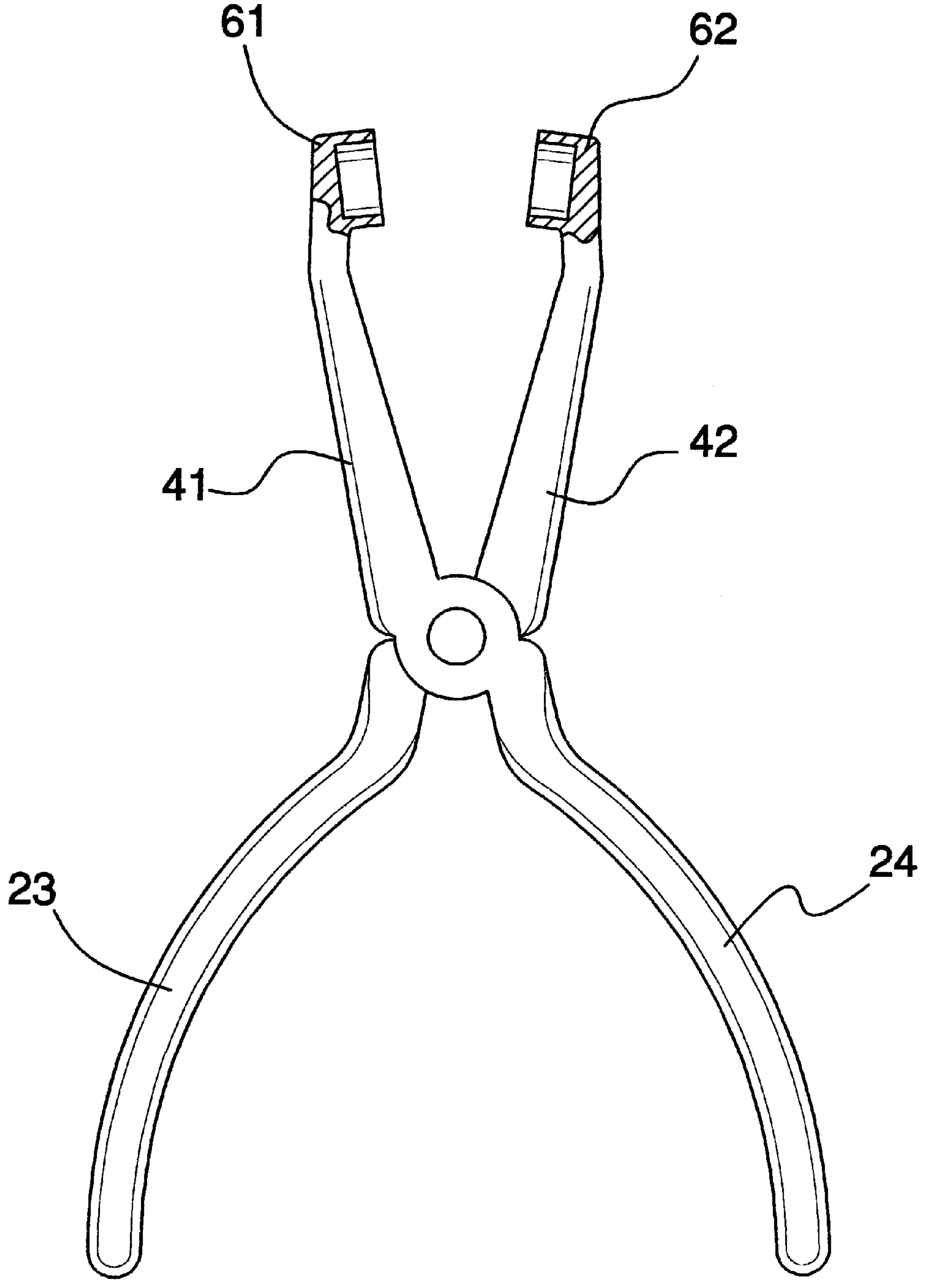
FIG. 3 is a schematic front view of the present invention.
Figure 4:
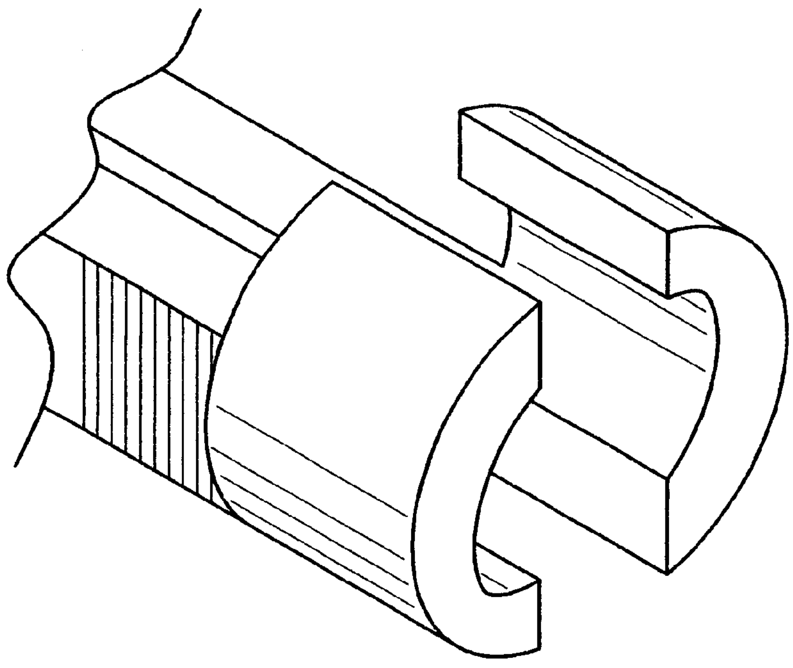
FIG. 4 is a schematic side view of the present invention.

With reference now to the drawings, and in particular to FIGS. 1 through 4 thereof, a new valve keeper installation device embodying the principles and concepts of the present invention and generally designated by the reference numeral 10 will be described.

As best illustrated in FIGS. 1 through 4, the valve keeper installation device 10 generally comprises a pliers member 20 having a handle portion 22, jaw portion 40, and a cup portion 60.

The pliers member 20 is used or engaging and compressing valve locks. The jaw portion 40 provides a compressive force during use. The handle portion 22 is designed for being grasp by a human hand, and has two opposed members 23,24 such that squeezing both opposed members 23,24 towards each other tightens the jaw portion 40 providing a compressive force. The handle portion 22 is preferably integrally coupled to the jaw portion 40.

Similarly, the cup portion 60 may also be integrally coupled to the jaw portion 40. The cup portion 60 is designed for engaging a valve keeper. The cup portion 60 has a first curved member 61 integrally coupled to a first jaw member 41 and a second curved member 62 integrally coupled to a second jaw member 42. The first 61 and second curved members 62 are positioned such that an longitudinal axis of the cup portion 60 is substantially collinear with a longitudinal axis of the device 10.

The cup portion 60 is tapered such that the cup portion 60 is for reaching into a countersunk area to place the keeper. The cup portion 60 has a proximal end 64 coupled to the jaw portion 40 and a distal end 65. The distal end 65 has a width, which is substantially less than the width of the proximal end 64.

The device 10 preferably is dimensioned to have a length of approximately six and one half inches and a width of approximately two and three-quarters inches.

In an embodiment the cup portion 60 is substantially magnetized to facilitating retaining the keeper while the keeper is being positioned.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A valve keeper installation device comprising:

a pliers member for engaging and compressing valve locks, said pliers member further including a jaw portion, a handle portion, and a cup portion;

said jaw portion for providing a compressive force;

said handle portion adapted for being grasped by a human hand, said handle portion having two opposed members such that squeezing both opposed members towards each other tightens said jaw portion providing a compressive force, said handle portion being integrally coupled to said jaw portion; and said cup portion integrally coupled to said jaw portion, said cup portion being adapted for engaging a valve keeper, said cup portion having a first curved member integrally coupled to a first jaw member, said cup portion having a second curved member integrally coupled to a second jaw member, said first and second curved members being positioned such that an longitudinal axis of said cup portion is substantially collinear with a longitudinal axis of said device.

2. The device of claim 1, wherein said cup portion being tapered such that said cup portion facilitating placement of the keeper, said cup portion having a proximal end coupled to said jaw portion, said proximal end having a width, said cup portion having a distal end, said distal end having a width substantially less than said width of said proximal end.

3. The device of claim 1 wherein said cup portion being substantially magnetized to facilitate retaining the keeper in said cup portion while the keeper is being positioned.

4. A valve keeper installation device comprising:

a pliers member for engaging and compressing valve locks, said pliers member further including a jaw portion, a handle portion, and a cup portion;

said jaw portion for providing a compressive force;

said handle portion adapted for being grasped by a human hand, said handle portion having two opposed members such that squeezing both opposed members towards each other tightens said jaw portion providing a compressive force, said handle portion being integrally coupled to said jaw portion; and said cup portion integrally coupled to said jaw portion, said cup portion being adapted for engaging a valve keeper, said cup portion having a first curved member integrally coupled to a first jaw member, said cup portion having a second curved member integrally coupled to a second jaw member, said first and second curved members being positioned'such that an longitudinal axis of said cup portion is substantially collinear with a longitudinal axis of said device;

wherein said device having a length of approximately six and one half inches, said device having a width of approximately two and three-quarters inches.

5. A valve keeper installation device comprising:

a pliers member for engaging and compressing valve locks, said pliers member further including a jaw portion, a handle portion, and a cup portion;

said jaw portion for providing a compressive force;

said handle portion adapted for being grasped by a human hand, said handle portion having two opposed members such that squeezing both opposed members towards each other tightens said jaw portion providing a compressive force, said handle portion being integrally coupled to said jaw portion;

said cup portion integrally coupled to said jaw portion, said cup portion being adapted for engaging a valve keeper, said cup portion having a first curved member integrally coupled to a first jaw member, said cup portion having a second curved member integrally coupled to a second jaw member, said first and second curved members being positioned such that an longitudinal axis of said cup portion is substantially collinear with a longitudinal axis of said device;

said cup portion being tapered such that said cup portion facilitating placement of the keeper, said cup portion having a proximal end coupled to said jaw portion, said proximal end having a width, said cup portion having a distal end, said distal end having a width substantially less than said width of said proximal end; and said device having a length of approximately six and one half inches, said device having a width of approximately two and three-quarters inches.

6. The device of claim 5, wherein said cup portion being substantially magnetized to facilitate retaining the keeper in said cup portion while the keeper is being positioned.

* * * * *